United States Patent [19]

Brackin et al.

[11] 4,144,772
[45] Mar. 20, 1979

[54] BELT IDLER CONSTRUCTION

[75] Inventors: John F. Brackin, Minnetonka; Melvin H. Jendersee, Apple Valley, both of Minn.

[73] Assignee: The Toro Company, Minneapolis, Minn.

[21] Appl. No.: 820,116

[22] Filed: Jul. 29, 1977

[51] Int. Cl.² .................................................. F16H 7/10
[52] U.S. Cl. ............................................... 74/242.15 R
[58] Field of Search ............... 74/242.15 R, 242.11 R, 74/242.1 R

[56] References Cited

U.S. PATENT DOCUMENTS

| | | | |
|---|---|---|---|
| 3,057,218 | 10/1962 | Knerr et al. | 74/242.15 R X |
| 3,430,507 | 3/1966 | Hurst et al. | 74/242.15 R |
| 3,975,965 | 8/1976 | Speer | 74/242.15 R X |

Primary Examiner—Leonard H. Gerin
Attorney, Agent, or Firm—Merchant, Gould, Smith, Edell, Welter & Schmidt

[57] ABSTRACT

An idler mechanism for maintaining tension on a drive belt of a belt drive system. The idler mechanism includes a pulley mounted to an idler arm for rotation about a rotational axis. The idler arm is attached to mounting apparatus having a resilient and damping element for eliminating vibration and dissipating shock loads on the belt and establishing tension in the belt. In the preferred embodiment the resilient and damping element comprises a torsional bushing having a torsional axis parallel to the pulley rotational axis and a torsional member constructed from a block of resilient elastomeric material which provides both tension and damping.

9 Claims, 5 Drawing Figures

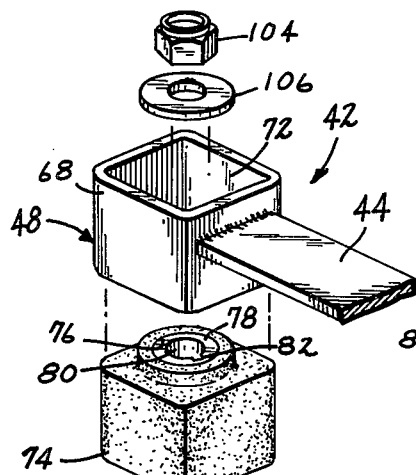
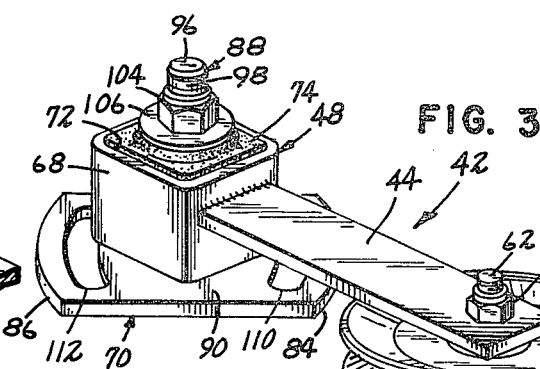
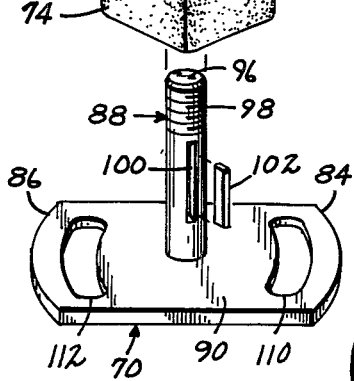
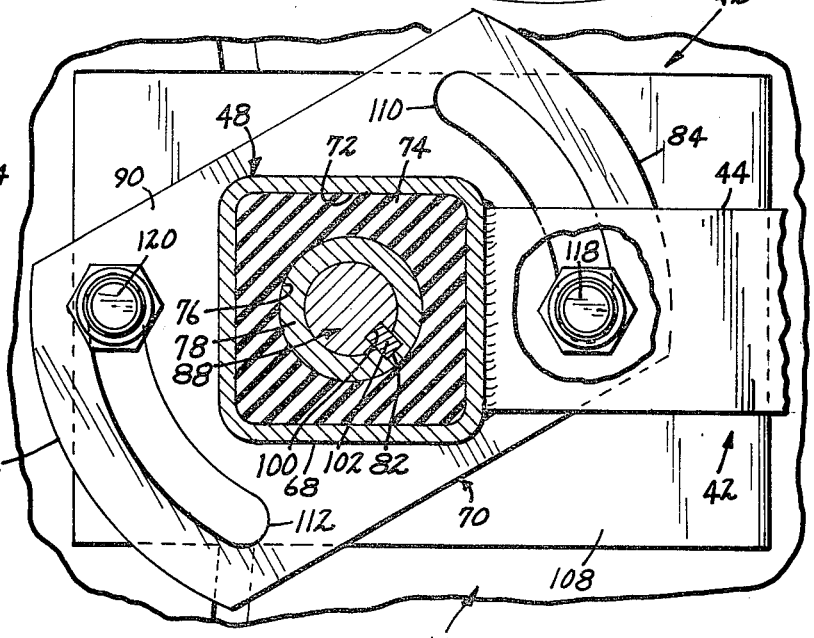
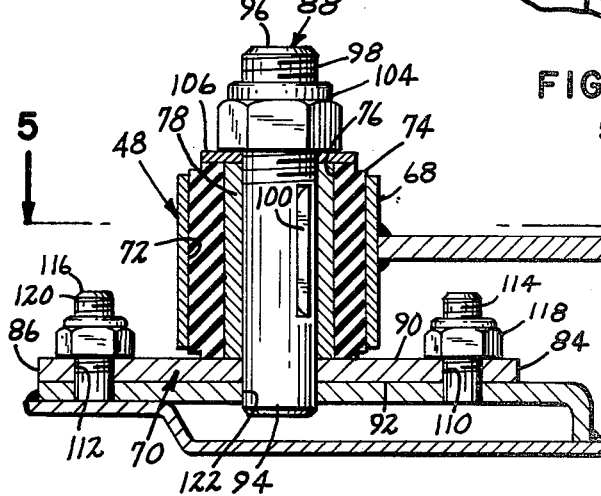
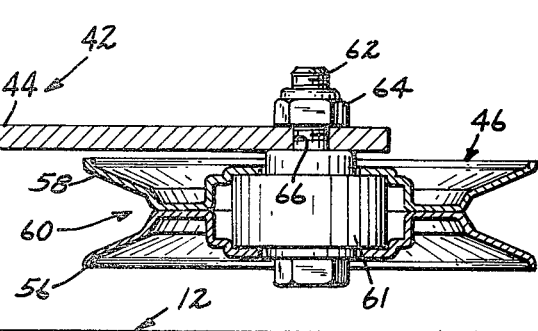

BELT IDLER CONSTRUCTION

BACKGROUND OF THE INVENTION

The present invention relates broadly to an idler mechanism for maintaining tension on a drive belt of a belt drive system. In particular, the present invention relates to an idler mechanism for maintaining tension on a belt utilized to drive rotary mowing apparatus.

Belt drive systems generally include a driving pulley and at least one driven pulley connected by an endless belt that transmits the rotation of the driving pulley to the driven pulleys. The drive belt is typically formed of a composite material having a high coefficient to friction and is subject to operational wear. Idler mechanisms for applying the proper tension to the drive belt to achieve power transmission from the driving to the driven pulley are also known in the prior art. The maintenance of the lowest acceptable tension in the drive belt, consistent with sufficient tension to hold the belt on its pulley path, is essential to maximum life of the belt.

In one prior art idler mechanism, an idler pulley is positioned at some point between the drive and driven pulleys and engages the drive belt to apply tension thereto. The tensioning pulley is provided with a substantially rigid mount. In another prior art system, a tensioning idler which is resiliently biased into tensioning engagement with a drive belt by an extension spring is provided.

These prior art idler mechanisms have a number of disadvantages when utilized in conjunction with belt drives for rotary mowing apparatus and other applications. In most applications, the drive pulley transmits varying power through the belt corresponding to variations in prime mover output, e.g. peak power during an engine power stroke. In addition, significant variations in load in most applications are transmitted back through driven pulleys to the belt in the form of further variation in tension and belt speed. The drive belt is subjected to intermittent changes in tension and driven speed which tend to cause the belt to jump or become untracked. With an idler mechanism having a substantially rigid mount, the belt's resiliency is the only thing which maintains the requisite tension. Because the belt stretches with time, belt tension must initially be set high to prevent untracking. This significantly shortens belt life. In systems wherein the idler mechanism is biased into tensioning engagement with the belt by an extension spring, this problem is somewhat alleviated, but the belt and the resilient idler are still subject to significant oscillations. Drive belt oscillations about the idler mechanism are also detrimental to belt life and, if severe enough, may result in belt disengagement from the idler mechanism and either the drive or driven pulleys.

Therefore, it is desirable to have an idler mechanism which will keep the drive belt tracked and also provide adequate power transmission at a low belt tension level. The present invention is an idler mechanism that incorporates a structure that effectively damps belt oscillations to keep the belt tracked while at the same time resiliently acting to maintain belt tension. By incorporating this structure into an idler mechanism, the life of the idler's associated drive belt may be significantly increased. This appears to be primarily due to the discovery that a reduced tensionsing force could be utilized with the idler mechanism of the present invention as opposed to prior art idlers without adversely affecting the power transmission characteristics of the belt drive system. In certain specific embodiments, the idler mechanism of the present invention also includes structure that facilitates adjustment of the drive belt tension in a simple operation.

SUMMARY OF THE INVENTION

The present invention is an idler mechanism for maintaining tension on the drive belt in a belt drive system and includes an idler arm to which is mounted a pulley for rotation about a rotational axis. Means are provided for mounting the idler arm so that the pulley engages the belt and applies force to the belt to tension the belt. The mounting means include a resilient means to establish tension in the belt and a damping means for eliminating vibration and dissipating shock loads on the belt.

In certain preferred embodiments, the resilient means and damping means comprise a damped torsional bushing having a torsional axis parallel to the rotational axis of the pulley. The damped torsional bushing includes a socket member in which is received a block of elastomeric material. A tubular passageway is disposed along a central axis of the block of elastomeric material, and the central axis is parallel to the rotational axis of the pulley. The mounting means further includes a mounting plate to which is affixed a rod received within the tubular passageway in the block of elastomeric material.

Preferably, a tubular metallic sleeve is received within the tubular passageway and has a keyway therein. The rod affixed to the idler plate has a projection thereon which is sized to fit within the keyway in the tubular sleeve. The mounting plate will typically be rigidly secured in some fashion, such as to a housing of a mower, and is a substantially rectangular member having a pair of arcuate slots in opposite ends thereof. The arcuate slots are sized to receive suitable fastening members and facilitate adjustment of the idler mechanism to regulate the tension applied to the drive belt. The rod may have wrench engagement means affixed thereto to facilitate adjustment of belt tension.

From the above description, it will be understood that the block of elastomeric resilient material provides the connection between the idler arm and the rigidly secured mounting plate and rod assembly. Through the elastomeric material, therefore, the tensioning force is applied to the drive belt. The block of elastomeric material also serves to damp the oscillations and drive and load variations associated with the drive belt. The idler mechanism of the present invention therefore substantially increases belt life by reducing belt wear. These and other advantages of our invention will become apparent with reference to the accompanying drawings, detailed description of the preferred embodiment, and claims.

BRIEF DESCRIPTION OF THE DRAWINGS

FIG. 2 is a fragmentary view in exploded perspective of a portion of a specific embodiment of the present invention;

FIG. 3 is a view in perspective of a specific embodiment of the present invention;

FIG. 4 is an enlarged view in vertical section seen generally along line 4—4 of FIG. 1;

FIG. 5 is an enlarged view in horizontal section seen generally along line 5—5 of FIG. 4.

DETAILED DESCRIPTION OF THE PREFERRED EMBODIMENT

Figure 1:
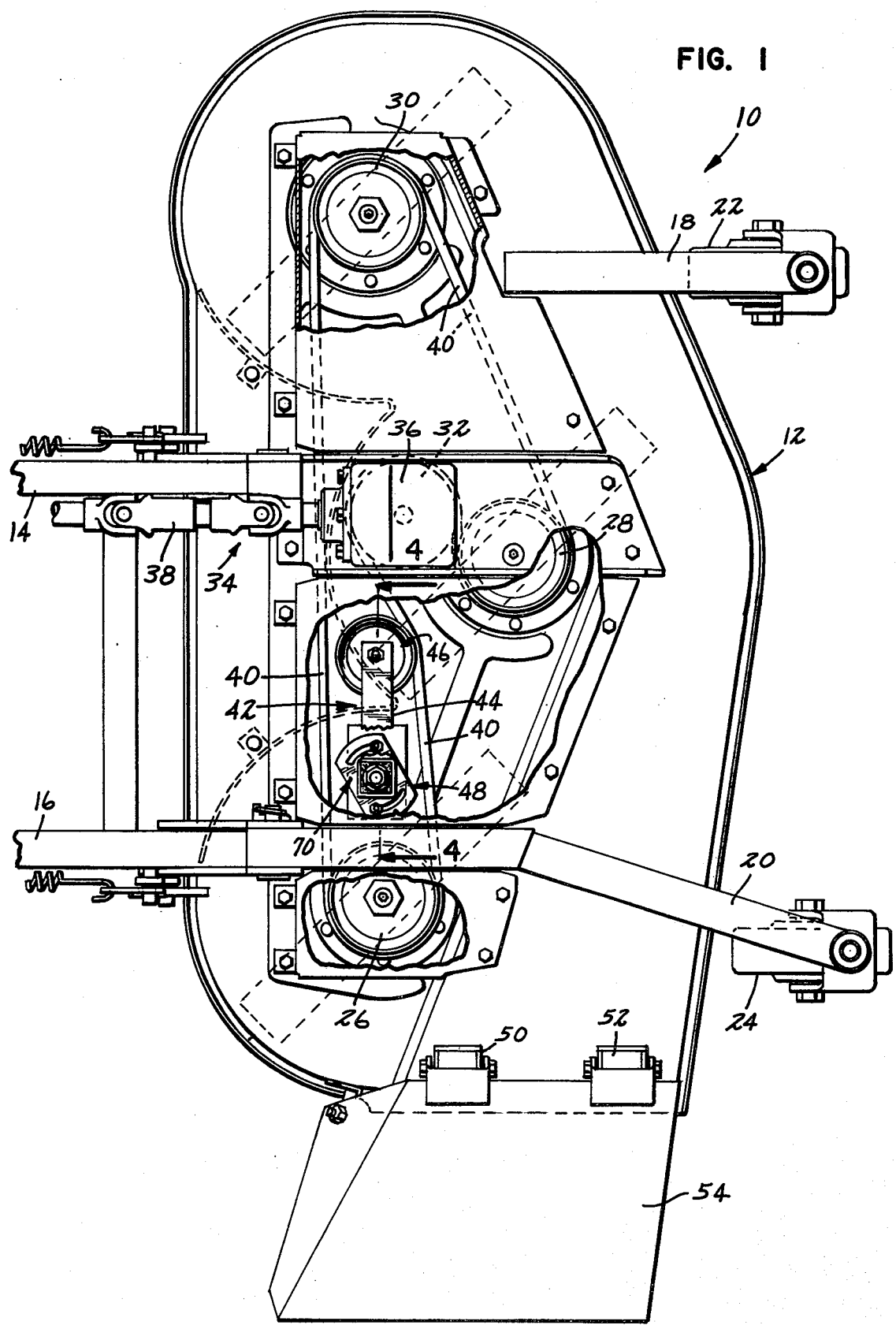
FIG. 1 is a top plan view of a portion of a rotary mower deck showing the specific embodiment of the present invention mounted thereon with portions broken away and shown in section.

Referring to the drawings, wherein like numerals represent like parts throughout the several views, FIG. 1 illustrates a rotary mower deck, designated generally as 10, that incorporates the idler mechanism according to one embodiment of the present invention. It will be understood that while the idler mechanism of the present invention is disclosed with reference to the three blade rotary mower deck 10 of FIG. 1, the idler mechanism has equal applicability in other belt drive systems. Rotary mower deck 10 includes a housing 12 under which are mounted for rotation a plurality of rotating cutting blades "shown". Rotary mower deck 10 is typically adapted to be carried at a controlled height over a lawn surface by a ground engaging vehicle, for example, a tractor or riding mower. A pair of support arms 14 and 16 to which mower apparatus 10 may be releasably attached extend to deck 10 from a ground engaging vehicle (not shown). Housing 12 also has a pair of forwardly extending support arms 18 and 20 to which a pair of ground engaging wheels 22 and 24 are attached to assist in maintaining mower deck 10 spaced above the ground surface.

The rotary cutting blades are driven by a belt drive system that includes pulleys 26, 28 and 30. Pulleys 26, 28 and 30 comprise driven pulleys that are attached to the cutting blades to impart rotational movement to the cutting blades. The belt drive system also includes a driving pulley 32 which, on the specific embodiment shown, is connected by means of power takeoff apparatus 34 to a power source on the ground engaging vehicle. In one specific embodiment in which this invention has been applied, the power source of the ground engaging vehicle was a one cylinder combustion engine. Power takeoff apparatus 34 includes a gear box assembly 36 and a universal shaft 38. Power is transmitted from driving pulley 32 to driven pulleys 26, 28 and 30 by an endless belt 40. Endless belt 40 typically is formed of a suitable belting material, normally a composite combining characteristics of limited resiliency and a high coefficient of friction.

To achieve reasonable power transmission from driving pulley 32 to driven pulleys 26, 28 and 30 and to prevent belt 40 from jumping a pulley in operation due to variable drive or load, endless belt 40 must be maintained under tension. An idler mechanism generally designated 42 is provided for applying the appropriate tension to belt 40. Idler mechanism 42 includes an idler arm 44 to which a pulley 46 mounted for rotation about a rotational axis. Pulley 46 is resiliently biased into contact with belt 40, applying a force thereto to produce tension in belt 40 as will be described in more detail hereafter. Arm 44 is attached to a mounting means 48 that secures idler mechanism 42 to housing 12. The structure of idler mechanism 42 and mounting means 48 will be described in more detail with reference to FIGS. 2-5.

Also attached to housing 12 by a pair of hinge devices 50 and 52 is a grass deflector 54. Grass clippings severed by the rotating blades of mower deck 10 are discharged from housing 12 through grass deflector 54.

Referring now to FIGS. 2-5, the structure of the idler mechanism of the present invention will now be described in greater detail. Pulley 46 includes a pair of pulley halves 56 and 58 that have generally concave outer surfaces and are secured back-to-back to define a generally concave annular groove 60 in which belt 40 is received. Pulley halves 56 and 58 may be fastened together in any convenient fashion such as by spot welding or riveting. In the embodiment shown, a bearing member 61 is centrally captivated in pulley 46 by the fastening of its halves. Pulley 46 is mounted to arm 40 for rotation about a rotational axis through its center by means of a bolt 62 and nut 64. Bolt 62 extends through bearing member 61 and also through an aperture 66 provided in arm 44 for mounting of pulley 46 thereon. It will be understood that although pulley 46 is disclosed in the preferred embodiment of the present invention, alternative equivalent structures having rolling or substantially frictionless contact with belt 40 for engaging and applying tension to belt 40 might readily be substituted and contemplated within the spirit and scope of the present invention.

Arm 44 is affixed to mounting means 48 that includes a torsional bushing 68 and a mounting plate 70. Torsional bushing 68 includes a socket 72 which is essentially a tubular member that is square in cross-section as shown in FIG. 5. Received within socket 72 is a block of resilient elastomeric material 74 which may be natural or synthetic rubber. Block 74 is installed in socket 72 typically by lubricating the inner walls of socket 72 and outer surface of block 74 and driving block 74 into socket 72. Block 74 has an exterior dimension before insertion somewhat greater than the interior dimension of socket 72 such that block 74 is held within socket 72 in a tight compressive engagement. Disposed along the central axis of block 74 is a tubular passageway 76 extending through block 74 and having an axis aligned with the central axis of block 74. The central axis of block 74 and the rotational axis of pulley 46 are generally parallel to each other. Received within tubular passageway 76 is a tubular metal sleeve 78 rigidly affixed to block 74. For example, block 74 may be molded about tubular sleeve 78 to ensure a firm bond therebetween. Metal sleeve 78 has an inner surface 80 in which is provided an elongated keyway 82 extending along the entire longitudinal dimension of tubular sleeve 78. In the embodiment as illustrated in FIG. 5, keyway 82 is aligned angularly about the central axis of block 74 at substantially 45 degrees with respect to a horizontal line lying in a plane normal to the sides of socket 72. Keyway 82 is, therefore, in one embodiment, positioned about the central axis of block 74 at substantially the same position as a corner of socket 72.

Mounting plate 70 is substantially rectangular having rounded ends 84 and 86 and has a top surface 90 and a bottom surface 92. Affixed to mounting plate 70 along a central axis normal to plate 70 is a rod 88. Rod 88 extends through an aperture in plate 70 and has a portion 94 which extends slightly beyond bottom surface 92 along the central axis of plate 70. Rod 88 is rigidly affixed to plate 70 by any suitable method such as welding. Rod 88 has a top end 96 which is provided with external threads at 98. A keyway 100 is provided in rod 88. Received within keyway 100 is a projection or key 102 that extends beyond the outer surface of rod 88 and is adapted to be received within keyway 82 in tubular sleeve 78. The engagement of projection 102 within keyway 82 prevents relative rotation of sleeve 78 about rod 88. Projection 102 also provides for a connection between torsional bushing 68 and rigidly mounted plate 70 as will be described in more detail hereafter.

Rod 88 is axially inserted within tubular sleeve 78. A wrench engagement means or nut 104 is provided for engagement with the external threads 98. A washer 106 is placed between nut 104 and block 74 and upon tightening nut 104, block 74 is urged against top surface 90 of mounting place 70.

Mounting plate 70 is rigidly attached to a housing portion 108. Plate 70 is provided with a pair of arcuate slots 110 and 112 disposed in opposite ends thereof. Arcuate slots 110 and 112 are symmetrical with respect to the central axis of plate 70, and, in the preferred embodiment, are circular arcs having equal radii measured from the axis defined by rod 88. Housing portion 108 is provided with a pair of outwardly projecting externally threaded bolts 114 and 116. Bolts 114 and 116 are received within circular arcuate slots 110 and 112, respectively. Nuts 118 and 120 threadedly engage bolts 114 and 116 and, when tightened, rigidly secure mounting plate 70 to housing portion 108. Housing portion 108 is provided with an aperture 122 through which projection portion 94 of rod 88 extends.

In operation, pulley 46 is adjusted to engage belt 40 and apply tensioning force thereto. To adjust the tension applied, nuts 118 and 120 are loosened and a suitable tool, such as a torque wrench, is utilized to grasp nut 104. Mounting plate 70 is rotated about its axis with bolts 114 and 116 sliding within circular arcuate slots 110 and 112 until the desired tension is achieved. Nuts 118 and 120 are then again tightened to top surface 90 of mounting plate 70. It will be understood that the torque imparted to nut 104 is transmitted through rod 88 and bushing 68 to mounting plate 70. In the case of the application illustrated in FIG. 1, the initial torque applied at rod 88 is 30 foot-pounds, which results in 60 pounds belt tension. During normal operation, the block 74, which is formed of a rubber material, will creep and take a permanent set in the drive belt system. The operating torque and tension following the initial block set are 20-25 foot-pounds and 40-50 pounds respectively. The prior art rigidly mounted idler mechanism typically requires significantly higher load or tension in the neighborhood of 75 pounds in order to maintain belt drive operation.

The tensioning force applied by pulley 46 to belt 40 has a torsional force component about the torsional axis of bushing 68. In particular, mounting plate 70 is rigidly attached to housing portion 108. Rod 88 is engaged with tubular metal sleeve 78 by projection 102. Tubular sleeve 78 is rigidly molded within the resilient elastomeric block 74 that is received within socket 72 attached to arm 44. Thus, the connection whereby force is transmitted from rigid support member 70 to wheel 46 is through the block of resilient elastomeric material 74. Block 74, thus, functions as a spring in applying tensioning force to wheel 46. For optimum performance, block 74 is formed of elastomeric material having a spring rate of 30 in.-lb./degree of deflection. Bushing 68 performs well when the spring rate of the elastomeric material lies in the range of 20-40 in.-lb./degree of deflection. The degree of deflection as used herein represents the angular deflection about the torsional axis of bushing 68 from a normal or relaxed state of the elastomeric material.

In addition block 74 functions when the belt 40 receives undesirable load shocks as previously described with reference to the power drive for the belt drive system and with respect to objects struck by the rotary cutting blades, to dampen these shocks. In particular, when a load shock is received at pulley 46, it is transmitted through arm 44 to bushing 68. The characteristics of block 74 of elastomeric material permit limited rotation of arm 44 about the torsional axis of bushing 68 and rod 88. In this regard block 74 functions as a damped spring to return pulley 46 to its tensioning position against belt 40. Oscillations that occur with extension springs are eliminated by utilization of block 74.

The prior art rigidly mounted idler mechanism, when utilized in conjunction with the three blade rotary mower deck 10 exhibited a belt life on the average of 71.7 working hours. Utilizing the torsional bushing incorporating resilient elastomeric material as in the present invention, the average belt life increased to between 195.5-240.2 hours. Thus, the idler mechanism of the present invention resulted in improved belt life of the magnitude of better than three times the belt life of the prior art rigidly mounted idler mechanism.

From the above description, it can be readily appreciated that the present invention is an idler mechanism for applying tension to a belt in a belt drive system wherein the advantages of substantially increased belt life and reduced belt tension are achieved. Additionally, the present invention is an idler mechanism having a structure that facilitates adjustment of belt tension in a simple yet effective operation.

We claim:

1. In a belt drive system, an idler mechanism for maintaing tension on a drive belt, comprising:
    (a) an idler arm;
    (b) a pulley mounted to said arm for rotation about a rotational axis;
    (c) a socket member affixed to said idler arm;
    (d) a block of elastomeric material received within said socket, said block defining a torsional axis parallel to said rotational axis;
    (e) tool engagement means secured to said block along said torsional axis; and
    (f) a mounting plate, secured to said engagement means, having a pair of circular arcuate slots therein sized to receive fastening means with a circular center corresponding to said torsional axis, whereby the tension applied by said idler mechanism to said belt may be adjusted by rotating said tool engagement means with a suitable tool.

2. In a belt drive system, an idler mechanism for maintaining tension on a drive belt, comprising:
    (a) an idler arm;
    (b) a pulley mounted to said arm for rotation about a rotational axis;
    (c) a socket member affixed to said idler arm;
    (d) a block of elastomeric material received within said socket, said block having a central axis and a tubular passageway therethrough, said tubular passageway having an axis aligned with said central axis, said aligned axes being parallel to said rotational axis;
    (e) a mounting plate;
    (f) a rod affixed to said mounting plate and received within said tubular passageway to secure said torsional bushing to said mounting plate; and
    (g) means for securing said rod to said torsional bushing.

3. An idler mechanism in accordance with claim 2 wherein said torsional bushing further comprises a tubular sleeve member received within said tubular passageway, said tubular sleeve having a first keyway therein, and said securing means comprises a projection affixed to said rod and sized to fit within said first keyway.

4. An idler mechanism in accordance with claim 3 wherein said rod has a second keyway in which is received said projection.

5. An idler mechanism in accordance with claim 2 wherein said mounting plate comprises a substantially rectangular member having a pair of circular arcuate solts formed therein at opposite ends thereof, said circular slots sized to receive fastening means therein and having a circular center corresponding to said torsional axis; and wherein said rod has a wrench engagement means affixed thereto whereby the tension applied by said idler mechanism to said belt may be adjusted by rotating said arm about said torsional axis by grasping said wrench engagement means with a suitable tool.

6. In a belt drive system for use in driving blades of rotary lawn moving apparatus, an idler mechanism for maintaining tension on a drive belt therefor, comprising:
 (a) an idler arm;
 (b) a pulley mounted to said arm for rotation about a rotational axis;
 (c) means for mounting said arm so that said pulley engages said belt and applies tension thereto, said mounting means comprising a damped torsional bushing with a spring rate in the range of 20-40 in.-lb./degree, said bushing having a torsional axis parallel to said rotational axis, whereby said bushing establishes damped tension on said belt to dissipate shock loads on the belt caused by variations in said mower cutting loads.

7. In a belt drive system, an idler mechanism for maintaining tension on a drive belt comprising:
 (a) an idler arm;
 (b) a pulley mounted to said arm for rotation about a rotational axis;
 (c) a socket member affixed to said idler arm;
 (d) a block of elastomeric material received within said socket, said block having a central axis and a tubular passageway therethrough, said tubular passageway having an axis aligned with said central axis, said aligned axes being parallel to said rotational axis;
 (e) a tubular sleeve member received within said tubular passageway and having a first keyway therein;
 (f) a mounting plate; and
 (g) a rod affixed to said mounting plate and received within said tubular sleeve, said rod having a projection affixed thereto sized to fit within said first keyway.

8. An idler mechanism in accordance with claim 7 wherein said rod has a second keyway therein in which is received said projection.

9. An idler mechanism in accordance with claim 8 wherein said mounting plate comprises a substantially rectangular member having a pair of circular arcuate slots formed therein at opposite ends thereof, said circular slots sized to receive fastening means therein and having a circular center corresponding to said torsional axis; and wherein said rod has a wrench engagement means affixed thereto whereby the tension applied by said idler mechanism to said belt may be adjusted by rotating said arm about said torsional axis by grasping said wrench engagement means with a suitable tool.

* * * * *